United States Patent
Montuno et al.

(10) Patent No.: US 10,215,837 B1
(45) Date of Patent: Feb. 26, 2019

(54) METHODS AND SYSTEMS FOR LOCALIZATION

(71) Applicants: Khalifa University of Science, Technology, and Research, Abu Dhabi (AE); British Telecommunications plc, London (AE); Emirates Telecommunications Corporation, Abu Dhabi (AE)

(72) Inventors: Delfin Y. Montuno, Abu Dhabi (AE); James Aweya, Abu Dhabi (AE)

(73) Assignees: Khalifa University of Science, Technology and Research, Abu Dhabi (AE); British Telecommunications plc, London (GB); Emirates Telecommunications Corporation, Abu Dhabi (AE)

(*) Notice: Subject to any disclaimer, the term of this patent is extended or adjusted under 35 U.S.C. 154(b) by 0 days.

(21) Appl. No.: 15/852,086

(22) Filed: Dec. 22, 2017

(51) Int. Cl.
| | |
|---|---|
| *G01S 5/06* | (2006.01) |
| *G01S 5/12* | (2006.01) |
| *H04W 4/02* | (2018.01) |
| *H04W 64/00* | (2009.01) |

(52) U.S. Cl.
CPC .............. *G01S 5/12* (2013.01); *G01S 5/06* (2013.01); *H04W 4/02* (2013.01); *H04W 64/00* (2013.01)

(58) Field of Classification Search
CPC ........... G01S 13/04; G01S 15/04; G01S 15/06
See application file for complete search history.

(56) References Cited

U.S. PATENT DOCUMENTS

2006/0025897 A1* 2/2006 Shostak ............... B60C 23/005
701/1

OTHER PUBLICATIONS

ITU-T G.8261, Timing and Synchronization Aspects in Packet Networks; International Telecommunication Union, (Aug. 2013).
ITU-T G.8261, Timing and Synchronization Aspects in Packet Networks; International Telecommunication Union, Amendment 1, (Jan. 2015).
ITU-T G.8261, Timing and Synchronization Aspects in Packet Networks; International Telecommunication Union, Corrigendum 1 (Apr. 2016).
Intersection of Ellipses, David Eberly, Geometric Tools, Redmond, WA 98052; Created: Oct. 10, 2000, Last Modified: Jun. 23, 2015.

* cited by examiner

*Primary Examiner* — Diane D Mizrahi
(74) *Attorney, Agent, or Firm* — Calfee, Halter & Griswold, LLP

(57) ABSTRACT

This invention relates to methods and systems for localization. It is particularly concerned with localization techniques based on time difference of arrival for wireless devices. Embodiments of the invention relate to techniques in which a transmitter transmits periodic distinguishable signals which are relayed upon receipt by the client whose location is sought in a form distinguishable from that of the transmitter. Signals from both the transmitter and the client are received by at least three signal receivers which generate a time difference of arrival based on the difference taken for a signal to reach the receiver directly and via the client. Further embodiments of the invention provide a phase detector in the receivers to determine the time difference of arrival between the signals.

27 Claims, 9 Drawing Sheets

Transmitter Signal leads Client Signal - Transmitter Signal Arrives First

METHODS AND SYSTEMS FOR LOCALIZATION

FIELD OF THE INVENTION

The present invention relates to methods and systems for localization. It is particularly, but not exclusively, concerned with localization techniques based on TDoA for wireless devices.

BACKGROUND OF THE INVENTION

Position location systems provide the most critical tracking support information required for location-sensitive services and applications. These may include commercial, enterprise and consumer location-based services and applications such as: delivery vehicle location tracking, package or shipment location tracking; service personnel location management; workforce management; asset management; roadside assistance, city/area boundary maintenance, and driving directions; enhanced dispatch; public safety services including the provision of emergency services (112 and 911) caller location information to emergency service centers; security applications including tracking the locations of probationers; child location tracking; parents may want to be able to track the whereabouts of their children; service locator; and location in wireless sensor networks.

Apart from providing valuable location information in the case of emergencies, location-based services have great potential for commercial applications that complement mobile device usage. The ability to provide services and information that are relevant to the users at their specific location could significantly enhance direction finding, the location of specific services such as cash points and restaurants, or even checking on the whereabouts of family members and friends. The new field of Location-Based Computing also depends heavily on information provided by position location systems.

Mathematical Background

As background to the embodiments of the invention described below, some background mathematical material is presented that will be helpful in understanding the algorithms used in those embodiments. Two important concepts used are the parametric description of an ellipse and the intersection of two ellipses. These concepts are described below.

General Equation of an Ellipse

Given the location of foci ($f_1$, $f_2$) and their distances ($r_1$, $r_2$) to a point on the ellipse, the parameters (a: width, b: height, e: eccentricity, (h, k): center) of the standard ellipse with horizontal major axis are computed as follows:

$$a=(r_1+r_2)/2$$

$$e=\text{distance}(f_1,f_2)/2a$$

$$b=\pm\sqrt{1-e^2}$$

(h, k) computed based on ($f_1$, $f_2$)

Its general equation on the x-y plane has the following form:

$$\frac{(x-h)^2}{a^2}+\frac{(y-k)^2}{b^2}=1$$

where
a is the radius along the x-axis,
b is the radius along the y-axis,
h and k are the x and y coordinates of the ellipse's center as shown in FIG. 8.

When the ellipse of FIG. 8 is rotated an angle θ counter-clockwise about its center, its rotated coordinates (x', y') are given in its original coordinates as follows:

$$x'=x\cos\theta+y\sin\theta$$

$$y'=y\cos\theta-x\sin\theta$$

Points of Intersection of Two Ellipses

Two ellipses in arbitrary orientation and distinct location can be in one of the following six placement configurations as shown in FIG. 9 with respect to each other:
 they are separated and non-overlapping
 one completely encloses the other
 they share only one common point
 they share only two common points
 they share only three common points
 they share only four common points The embodiments of the present invention are interested mainly in the application of ellipse intersection. Therefore, reference is made to existing literature [2] on how to determine the placement configurations described above and also the points of intersection.

Determining the Parameters of an Ellipse

Generally, the semi-major axis, semi-minor axis, and eccentricity of an ellipse are determined given the location of its foci and a point on the ellipse. Without loss of generality, these parameters of a standard ellipse (as shown in FIG. 14) can be determined as follows.

Given the locations of $f_1$ and $f_2$ forming the foci of an ellipse and the location of a point on the ellipse at p, its parameters consisting of semi-major axis a, semi-minor axis b, and eccentricity e, can be determined as follows:

$$a=(\text{distance}(f_1,p)+\text{distance}(f_2,p))/2$$

$$e=\text{distance}(f_1,f_2)/(2a)$$

$$b=\pm a\sqrt{1-e^2}$$

Note that the following relations in FIG. 14:

$$2a=\text{distance}(f_1,p)+\text{distance}(f_2,p)$$

$$2a=\text{distance}(f_1,f_2)+\Delta$$

Therefore, given the locations of the foci of an ellipse, the parameters of the ellipse can also be determined if the value of Δ shown in FIG. 14 is known. The value of Δ can be defined as the difference between the path indirectly from $f_1$ to $f_2$ through p and the path directly from $f_1$ to $f_2$.

The above measurement effectively provides the following relation: $\Delta=2a-\text{distance}(f_1,f_2)$ and together with the locations of the foci, defines the ellipse without having to explicitly know the location of the point p or any such point on the ellipse.

An object of the present invention is to provide a method and system for locating a client device connected to a wireless network.

SUMMARY OF THE INVENTION

An exemplary embodiment of the invention provides a system configured to physically locate a client device, the system including: a transmitter station configured to transmit a first wireless signal; at least 3 receiver stations; and a location management station; wherein: each receiver station is configured to receive the first signal and a second wireless signal transmitted from the client device and triggered by receipt of the first signal by the client device; the receiver stations and/or the location management station are configured to determine a time difference of arrival between the first signal and second signal for each of the receiver stations; and the location management stations is configured to: compute, based on the corresponding time difference of arrival for each receiver station, a plurality of ellipses each associated with a respective receiver station, each ellipse having a first focal point corresponding to the transmitter station and having a second focal point corresponding to the respective receiver station; determine a plurality of intersection points between pairs of said ellipses; and estimate the location of the client device using said determined intersection points.

A further exemplary embodiment of the invention provides a method of locating a client device using a wireless network, having the steps of: transmitting, from a transmitter stations, a first signal; receiving, at a client device, the first signal; transmitting, from the client device, a second signal which corresponds to the first signal and whose transmission is triggered by receipt of the first signal; receiving, at each of at least three receiver stations, the first signal and the second signal; determining, for each of the receiver stations, a time difference of arrival between the first signal and second signal; computing, for each of the receiver stations and based on the corresponding time difference of arrival, an ellipse having a first focal point corresponding to the transmitter station and having a second focal point corresponding to the respective receiver station; determining a plurality of intersection points between pairs of said ellipses; and estimating the location of the client device using said determined intersection points.

A further exemplary embodiment of the invention provides a location management station, connected to a wireless network, and having a processor, wherein the processor is configured to: receive, from each of at least three receiver stations connected to the wireless network, a time difference of arrival measurement, the time difference of arrival measurement being the time difference between the arrival of a first signal and a second signal at the respective received stations, wherein: the first signal is a signal transmitted from a transmitter station; and the second signal is a signal corresponding to the first signal and transmitted from a client device, the transmission of which is triggered by receipt, at the client device, of the first signal; compute, for each of the receiver stations and based on the corresponding time difference of arrival, an ellipse having a first focal point corresponding to the transmitter station and having a second focal point corresponding to the respective receiver station; determine a plurality of intersection points between pairs of said ellipses; and estimate the location of the client device using said determined intersection points.

BRIEF DESCRIPTION OF THE DRAWINGS

Embodiments of the invention will now be described by way of example with reference to the accompanying drawings in which.

DETAILED DESCRIPTION

Figure 1:
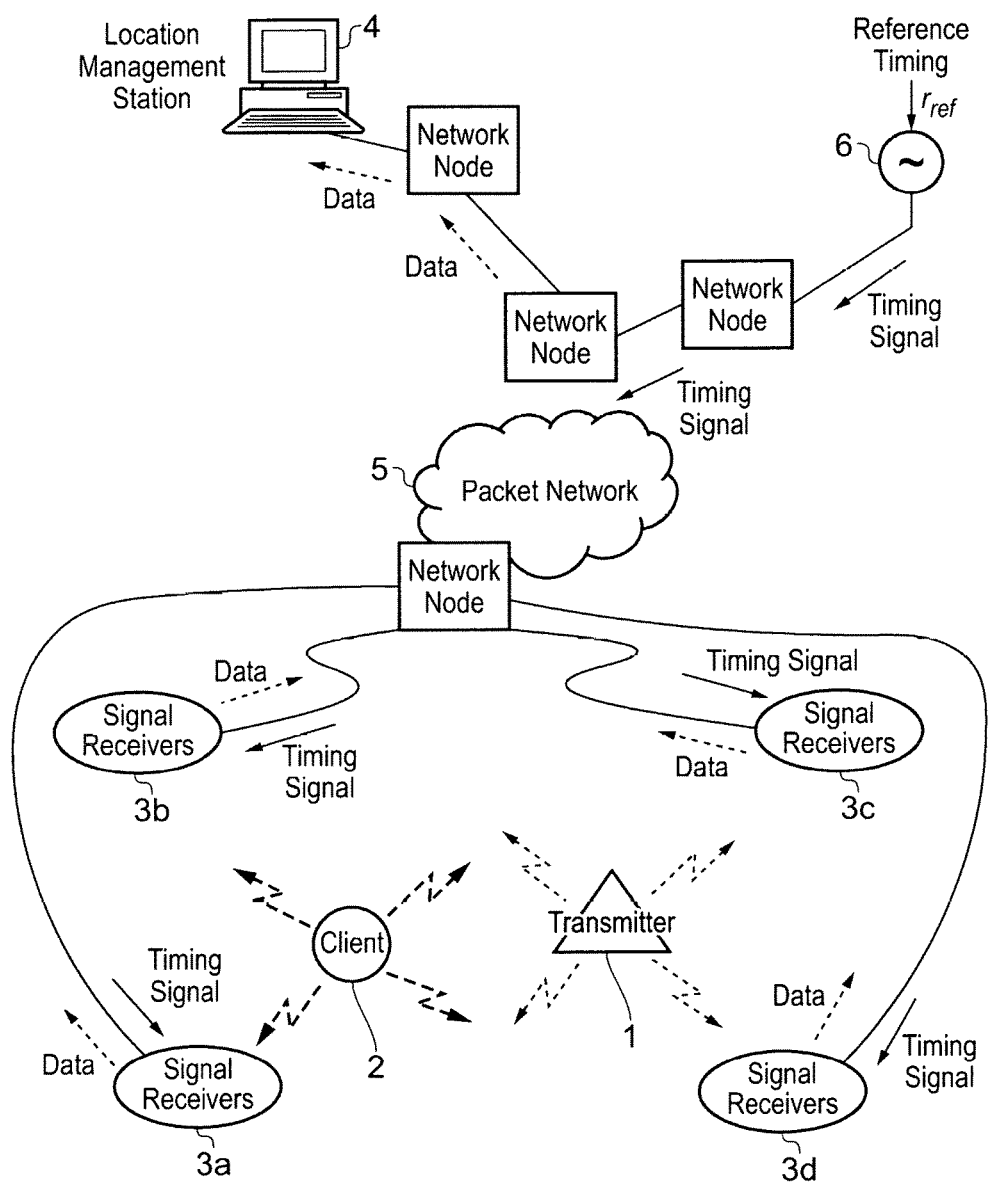
FIG. 1 shows the architecture of a localization system according to an embodiment of the present invention.

At their broadest, aspects of the present invention provide for methods and systems able to physically locate a client device broadcasting in a network, by utilizing some of the inherent properties of ellipses.

A first aspect of the present invention provides a system configured to physically locate a client device, the system including: a transmitter station configured to transmit a first wireless signal; at least 3 receiver stations; and a location management station; wherein: each receiver station is configured to receive the first signal and a second wireless signal transmitted from the client device and triggered by receipt of the first signal by the client device; the receiver stations and/or the location management station are configured to determine a time difference of arrival between the first signal and second signal for each of the receiver stations; and the location management stations is configured to: compute, based on the corresponding time difference of arrival for each receiver station, a plurality of ellipses each associated with a respective receiver station, each ellipse having a first focal point corresponding to the transmitter station and having a second focal point corresponding to the respective receiver station; determine a plurality of intersection points between pairs of said ellipses; and estimate the location of the client device using said determined intersection points.

The system of this aspect implements an ellipse-based position location scheme which can allow for efficient location discovery of clients in wireless networks. The scheme can use the time difference of arrival (TDOA) between two signals at a plurality of receivers, which are respectively directly received from the transmitter and rebroadcast from the client. By measuring the TDOA of these signals locally at each receiver, geometric relations can be formulated and used in determining the location of the client.

The system can also operate with no communication overhead for the transmitter, client and signal receivers.

A semi-major axis or a semi-minor axis of each ellipse may be calculated based on the corresponding time difference of arrival for that receiver station.

The receiver stations and/or the location management station may be configured to determine a distance, delta (receiver$_i$), which is the distance corresponding to the time difference between the receipt of the first signal and receipt of the second signal at the receiver station. This distance can then be used in the computation of an ellipse having the i$^{th}$ receiver station as one of its focal points. This distance can be calculated from the time difference of arrival.

The location management station may be configured to calculate, for an i$^{th}$ ellipse corresponding to an i$^{th}$ receiver station, a semi-major axis $a_i$, which is half of the sum of: a) a known distance, distance ($f_1$, $f_2$), between the respective receiver station and the transmitter station; and b) delta (receiver$_i$).

The location management station may be configured to calculate, for an i$^{th}$ ellipse corresponding to an i$^{th}$ receiver, an eccentricity $e_i$ of the ellipse as:

$$e_i = \frac{\text{distance}(f_1, f_2)}{2a_i}$$

The location management station may be configured to calculate, for an i$^{th}$ ellipse corresponding to an i$^{th}$ receiver station, a semi-minor axis $b_i$ of the ellipse as:

$$b_i = \pm a_i\sqrt{1-e_i^2}$$

When determining a plurality of intersection points between pairs of said ellipses, the location management station may be configured to solve, for at least two distinct pairs of the computed ellipses, the following simultaneous equations:

$$\frac{(x-h_i)^2}{a_i^2} + \frac{(y-k_i)^2}{b_i^2} = 1; \text{ and}$$

$$\frac{(x-h_j)^2}{a_j^2} + \frac{(y-k_j)^2}{b_j^2} = 1$$

where ($h_i$, $k_i$) is the center of the ellipse corresponding to an i$^{th}$ receiver station and is computed based on the foci of the said ellipse receiver station and the transmitter locations;

($h_j$, $k_j$) is the center of the ellipse corresponding to an j$^{th}$ receiver station and is computed based on the foci of the said ellipse receiver station and the transmitter locations; and each (x, y) satisfying the above simultaneous equations corresponds to the coordinates of an intersection point between the pair of ellipses i.e. the ellipses corresponding to the i$^{th}$ and j$^{th}$ receiver station.

The computation overhead at the receiver stations and the location management station can be kept very low, as the location detection involves only simple algebraic operations over scalar values.

The location management station may determine an intersection point in common between the at least two pairs of computed ellipses.

The receiver stations may share a common clock. Alternatively, the receiver stations may each include an independently running clock, and the clocks of each receiver station may share a nominal frequency.

However, the location system of this aspect does not require time (i.e. time-of-day) synchronization between the signal receivers, only the coarse frequency synchronization, typically of the order of tens of parts-per-million (ppm). The system can even work for the case where the signal receivers are run asynchronously. In such cases it is preferable that the frequency accuracies of the signal receivers are in the order of not more than, say, 50 ppm.

The transmitter station and the receiver stations may all be transceiver stations, and the transmitter station may be chosen from the transceiver stations by determining a smallest round trip delay from each transceiver station to the client.

The first signal and the second signal may be periodic signals which share the same nominal frequency. Each receiver station may include a signal phase detector circuit, the circuit may count at a frequency $f_{os}$ a number of counts $C_i$ between receiving the first signal and receiving the second signal at the respective receiver station, and the distance delta(receiver$_i$) may be calculated as:

$$\text{delta(receiver}_i) = \frac{C_i \cdot c}{f_{os}},$$

where c is the speed of light.

The system may include the client device, and the client may be configured to transmit the second signal, the transmission of the second signal being triggered by receipt of the first signal at the client.

The location management station may be part of either the transmitter station or one of the receiver stations, or the client device, or separately provided.

The system of the present aspect may include any combination of some, all or none of the above described preferred and optional features.

A second aspect of the present invention provides a method of locating a client device using a wireless network, having the steps of: transmitting, from a transmitter station, a first signal; receiving, at a client device, the first signal; transmitting, from the client device, a second signal which corresponds to the first signal and whose transmission is triggered by receipt of the first signal; receiving, at each of at least three receiver stations, the first signal and the second signal; determining, for each of the receiver stations, a time difference of arrival between the first signal and second signal; computing, for each of the receiver stations and based on the corresponding time difference of arrival, an ellipse having a first focal point corresponding to the transmitter station and having a second focal point corresponding to the respective receiver station; determining a plurality of intersection points between pairs of said ellipses; and estimating the location of the client device using said determined intersection points.

The method of this aspect implements an ellipse-based position location scheme which can allow for efficient location discovery of clients in wireless networks. The scheme can use the time difference of arrival (TDOA) between two signals at a plurality of receivers, which are respectively directly received from the transmitter and rebroadcast from the client. By measuring the TDOA of these signals locally at each receiver, geometric relations can be formulated and used in determining the location of the client.

The method can typically operate with no communication overhead for the transmitter, client and signal receivers.

A semi-major axis or a semi-minor axis of each ellipse may be calculated based on the corresponding time difference of arrival for that receiver station.

The method may include a step of determining a distance, delta(receiver$_i$), which is the distance corresponding to the time difference between the receipt of the first signal and receipt of the second signal at the $i^{th}$ receiver station. This distance can then be used in the computation of an ellipse having the $i^{th}$ receiver station as one of its focal points. This distance can be calculated from the time difference of arrival.

The method may include a step of calculating, for an $i^{th}$ ellipse corresponding to an $i^{th}$ receiver station, a semi-major axis $a_i$ which is half of the sum of: a) a known distance, distance($f_1$, $f_2$) between the respective receiver station and the transmitter station; and b) delta(receiver$_i$).

The method may include a step of calculating, for an $i^{th}$ ellipse corresponding to an $i^{th}$ receiver station, an eccentricity $e_i$ of the ellipse as:

$$e_i = \frac{\text{distance}(f_1, f_2)}{2a_i}$$

The method may include a step of calculating, for an $i^{th}$ ellipse corresponding to an $i^{th}$ receiver station, a semi-minor axis $b_i$, of the ellipse as:

$$b_i = \pm a_i \sqrt{1-e_i^2}$$

The method may include a step of solving, for at least two distinct pairs of the computed ellipses, the following simultaneous equations:

$$\frac{(x-h_i)^2}{a_i^2} + \frac{(y-k_i)^2}{b_i^2} = 1; \text{ and}$$

$$\frac{(x-h_j)^2}{a_j^2} + \frac{(y-k_j)^2}{b_j^2} = 1$$

where ($h_i$, $k_i$) is the center of the ellipse corresponding to an $i^{th}$ receiver station and is computed based on the foci of the said ellipse receiver station and the transmitter locations; ($h_j$, $k_j$) is the center of the ellipse corresponding to an $j^{th}$ receiver station and is computed based on the foci of the said ellipse receiver station and the transmitter locations; and each (x, y) satisfying the above simultaneous equations corresponds to the coordinates of an intersection point between the pair of ellipses.

The computation overhead at the receiver stations and the location management station can be kept very low, as the location detection involves only simple algebraic operations over scalar values.

The receiver stations may share a common clock. Alternatively, each receiver station may include an independently running clock and the clocks of each receiver station may share a nominal frequency.

However, the location method of this aspect does not require time (i.e. time-of-day) synchronization between the signal receivers, only the coarse frequency synchronization, typically of the order of tens of parts-per-million (ppm). The method can even work for the case where the signal receivers are run asynchronously. In such cases it is preferable that the frequency accuracies of the signal receivers are in the order of not more than, say, 50 ppm.

The transmitter station and the receiver stations may all be transceiver stations, and the method may include a step of: choosing the transmitter station from the transceiver stations by determining a smallest round trip delay from each transceiver station to the client.

The first signal and the second signal transmitted according to the method of the second aspect may be periodic signals which share the same nominal frequency.

A signal phase detector circuit, which may be within each receiver station, may count at a frequency of $f_{os}$ a number of counts $C_i$ between receiver the first signal and receiving the second signal at the respective receiver station, and may calculate the distance delta(receiver$_i$) as:

$$\text{delta(receiver}_i) = \frac{C_i \cdot c}{f_{os}},$$

where c is the speed of light (which may be as measured in meters per second).

The phase detector circuit according to the first or second aspects of the invention can be implemented as a pair of D-type master-slave flip-flops or R-S latches. An output UP of the circuit may respond only to positive-going edges of the first signal.

The method of the present aspect may include any combination of some, all or none of the above described preferred and optional features.

Further aspects of the present invention include computer programs for running on computer systems which carry out the method of the above aspect, including some, all or none of the preferred and optional features of that aspect.

A third aspect of the present invention provides a location management station, connected to a wireless network, and having a processor, wherein the processor is configured to: receive, from each of at least three receiver stations connected to the wireless network, a time difference of arrival measurement, the time difference of arrival measurement being the time difference between the arrival of a first signal and a second signal at the respective received stations, wherein: the first signal is a signal transmitted from a transmitter station; and the second signal is a signal corresponding to the first signal and transmitted from a client device, the transmission of which is triggered by receipt, at the client device, of the first signal; compute, for each of the receiver stations and based on the corresponding time difference of arrival, an ellipse having a first focal point corresponding to the transmitter station and having a second focal point corresponding to the respective receiver station; determine a plurality of intersection points between pairs of said ellipses; and estimate the location of the client device using said determined intersection points.

The processor of the location management system of this aspect may also be configured to perform any further optional or preferred steps of the above described second aspect.

A fourth aspect of the present invention provides a client device, connected to a wireless network, and having a controller configured to perform the method of the second aspect.

Location System Architecture

Embodiments of the present invention provide techniques for determining the location of an untethered wireless client that relays signals from a reference transmitter (or beacon) in a wireless network environment. The architecture of a system according to an embodiment of the present invention is shown in FIG. 1. The network environment contains at least one reference transmitter that sends periodic signals. There are also at least three signal receivers that receive the signals relayed from the client and the signals transmitted by the reference transmitter. At a receiver, the signal relayed by the client is distinguishable from the signal received directly from the reference transmitter.

Figure 2:
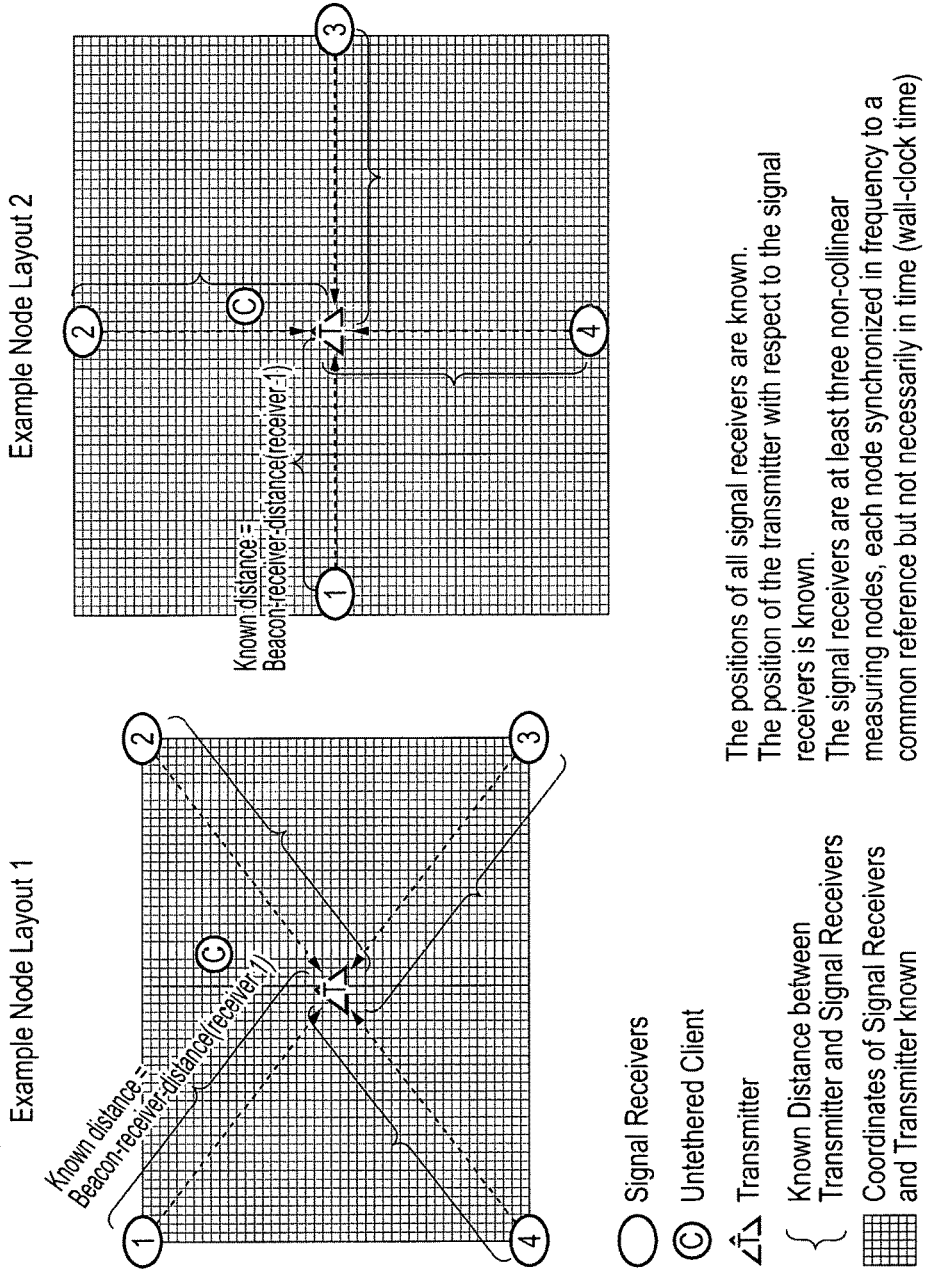
FIG. 2 shows sample node layout diagrams for signal receivers and a transmitter in a localization system according to an embodiment of the present invention.

The distance from the transmitter to each signal receiver is assumed to be known and available, that is the device (both transmitter and signal receivers) layout plan in location and distance is known a priori to the network engineer as shown in FIG. 2. As would be expected, the availability of a common clock at the signal receivers would provide more accurate client location. However, the techniques set out in embodiments of the present invention do not preclude the use of independently running (asynchronous) clocks at the receivers, but such clocks preferably have the same nominal frequency and their frequency deviations are well constrained.

Further, although the operation of the embodiments described below and the location solutions obtained are described in a planar context, they can be generalized in a straightforward manner to a three-dimensional context.

For the purposes of the explanation below, it is assumed that no three receivers are placed collinearly, and that the signal receivers reference the transmitter and client pulse instances when inferring the distance of a particular client. When there is more than one client, the clients can be distinguished by their respective unique pulse signature (see, for example, FIG. 3).

At the heart of the location system architecture according to an embodiment of the present invention is a location management station that performs the following:

Retrieves measurement data from the network, from mobile devices, or from location measurement units. All measurements in the location system are sent to the location management station for further processing and analysis. However, a degree of initial processing (e.g. of time differences and/or distance calculations) may be performed by the other units prior to the data being sent to the location management station.

Calculates mobile positions from the measurement data. Using measurements from location measurement units and other network data, the location management station calculates the position of target mobiles.

Administers and controls the location system. For example, in the mobile networking case, the location management station sends the mobile's position latitude and longitude calculations through the base station controller (BSC) and mobile switching center (MSC) to gateway mobile location centers for distribution to applications/servers for location-based mobile services.

Manages communications between the location system and external entities such as gateway mobile location centers and network operations centers. In addition to calculating mobile positions, the management station can also manage, coordinate, and administer the location system and provide interfaces to external entities such as network operations and administration centers/systems.

The location management station may be a dedicated computing device which is separate from, but connected to, the elements of the wireless network, or it may operate within the architecture of the transmitters and/or receivers and/or client(s). There may be a single location management station for the network, or there may be a plurality of such stations which are each capable of operating in this manner. Elements of the location management station may also be distributed across different devices, including the transmitters and/or receivers.

In one typical application of the location system, a location activity is initiated by an application external to the location system itself. For example, a gateway mobile location center, in response to an application's request for a location (for example, to find a child), screens the request and forwards it through the network to the location management station. Similarly, at the end of the location process, the location management station usually sends calculated mobile position information through a gateway mobile location center to an external entity, generally the application that initiated the location activity or, in the case of public safety locations, to the appropriate emergency service center/public safety answering point.

Outline of the Location System Architecture

Figure 3:
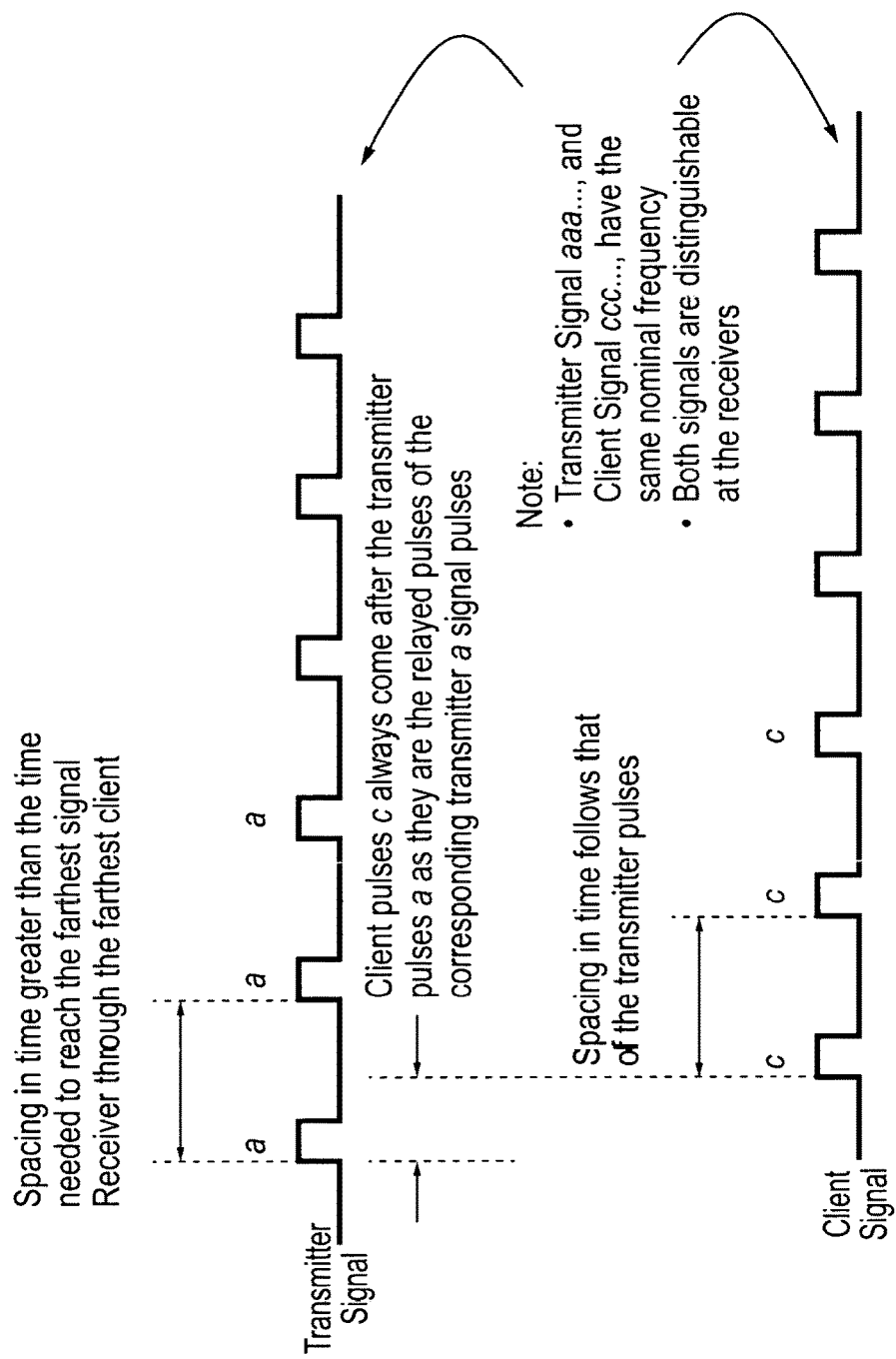
FIG. 3 shows the relationship between transmitter and untethered client signals.

FIG. 1, FIG. 2 and FIG. 3 show the main features of a location system architecture according to an embodiment of the present invention. Features of the architecture of this embodiment include:

A transmitter 1 that transmits periodic distinguishable signals also at a nominal frequency $f_{nom}$ (FIG. 1).

A client 2 which relays the transmitter signal upon receiving it, the relayed signal being distinguishable from that of the transmitter 1.

At least three signal receivers (3a . . . 3d) that receive the periodic distinguishable signals from the transmitter 1 and relayed from the client 2 (FIG. 1).

Preferably, the signal receivers are assumed to be frequency synchronized to a common clock 6 with frequency, $f_{ref}$, and each signal receiver in turn synthesizes a very high speed sampling clock with frequency from this common clock. Frequency synchronization could be achieved by any of the methods described in [1] for Layer 1 or Layer 2 frequency transfer. Note that only frequency synchronization is preferred at the signal receivers and not time synchronization (i.e., wall-clock transfer).

In an alternative to the above, the signal receivers could be run asynchronously but with each receiver having the same nominal frequency and well constrained deviation from nominal (in parts-per-million, (ppm)). The maximum deviation in this case will dictate how accurate the location system will perform. A frequency deviation will result in a client location being defined by a cluster of points instead of a single point as will be the case when all receiver frequencies are tightly synchronized.

It is also assumed that the signal receivers are placed non-collinearly, the relative positions of the receivers and the transmitter are known (FIG. 2), and only the location of the client is unknown but is in the area of interest. The most desirable layout of the signal receivers is one where their locations form the vertices of a diamond and the transmitter is at the center as that of the node layout diagram on the right side of FIG. 2.

The signal receivers each reference the same transmitter and client pulse instances to generate a time difference of arrival (TDOA) between the transmitter signal and the client's relayed signal. The TDOA is then used to generate a distance difference (or phase distance) between the distance from the transmitter directly to the receiver and the distance from the transmitter indirectly to the receiver through the client. Each signal receiver then forwards its distance difference measurement for a particular client to a location management station which executes an algorithm to determine the actual location of the client. Each signal receivers employs a phase detector (described in more detail below) to determine the TDOA between the transmitter signal and the client signal.

The signal receivers 3a-3d are connected to a location management station 4 through a packet network 5. The transmitter may also be connected to this network.

Measuring the TDOA at the Signal Receivers—Phase Detector Architecture

Figure 4:
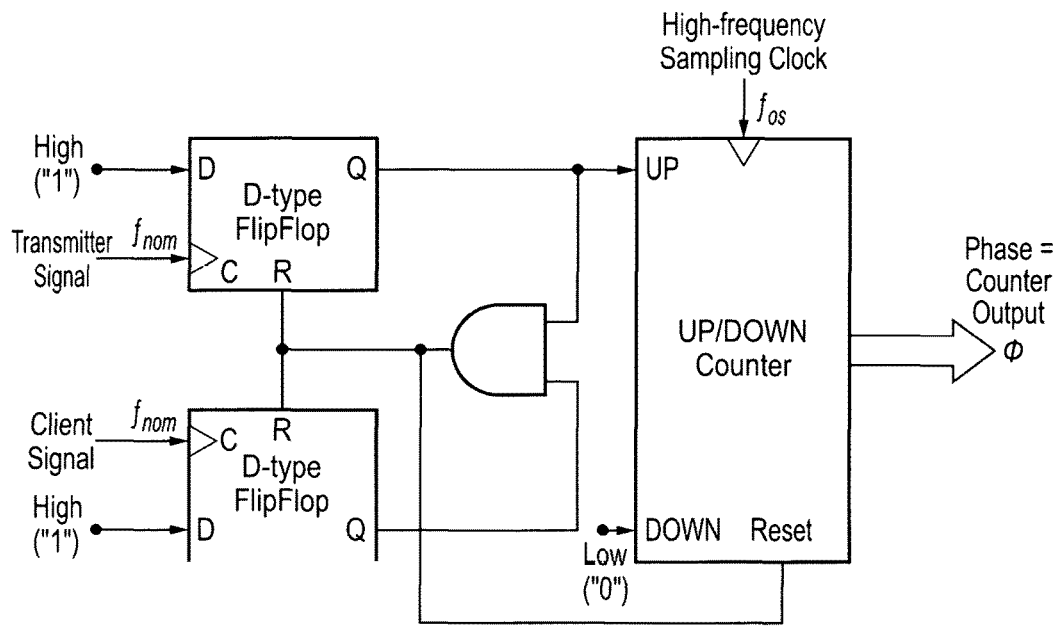
FIG. 4 shows an example of the phase detector architecture for detecting the difference between transmitter and client signals at a signal receiver.

A digital transmitter-client signal phase detector (PD) circuit can be implemented using either D-type master-slave flip-flops or R-S latches. FIG. 4 shows a PD built with D-type flip-flops. The output UP will respond only to the positive-going edges of the input "Transmitter Signal". Therefore, the input duty cycles do not have any effects on the outputs.

Figure 5:
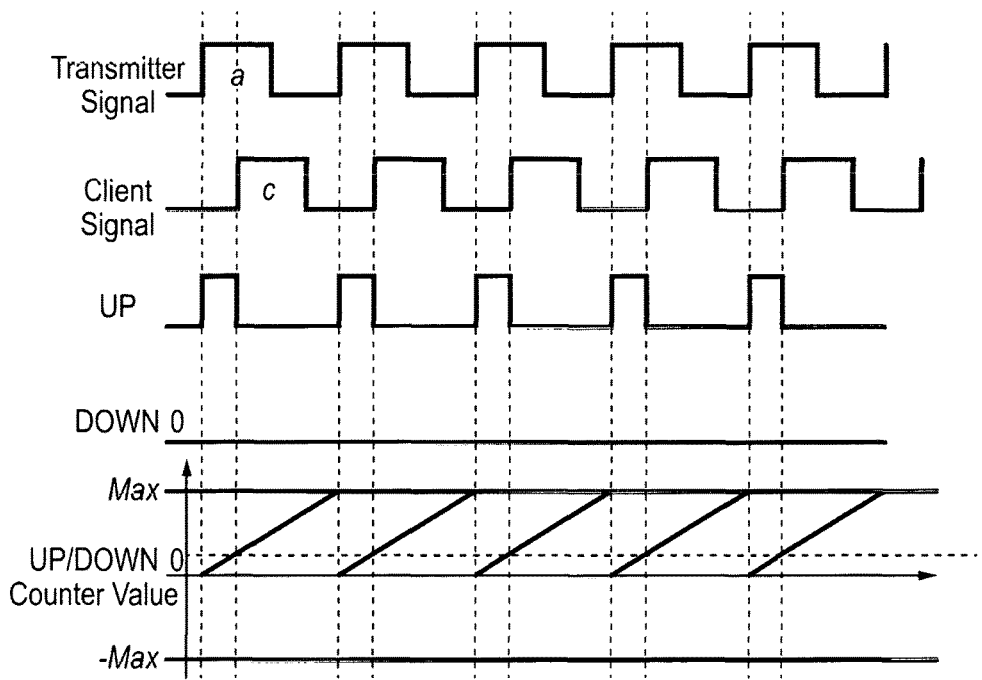
FIG. 5 shows the operation of the phase detector of FIG. 4.

The operation of a typical PD is illustrated in FIG. 5. The time value of the differential output, (UP), measured by the high-speed counter is an indication of phase difference between the transmitter signal and client signal. The frequency of the high-speed sampling oscillator $f_{os}$ driving the UP/DOWN counter is chosen such that the location system will have a good precision. Given that c is the speed of light in meters per second (299,792,458 meters per second), then the distance traveled in $1/f_{os}$ seconds is $c/f_{os}$, meters, which is also the precision of the location system.

It can be assumed that the transmitter signal period is quantized (by the high-speed clock with frequency $f_{os}=1/\tau_{os}$) into Max steps, i.e., Max=$\tau_{nom}/\tau_{os}$, where $\tau_{nom}$ is the period of the transmitter pulses. It is also assumed that the maximum value of the PD counter is higher than Max. The UP-DOWN counter is a binary counter of certain size whose upper limit can be denoted as Max. Before a reset, the value stored in the counter is latched out.

In the location system the transmitter is assumed to have a nominal frequency. The phase difference between the transmitter and the client signals depends on where the client is with respect to transmitter and the receivers. Since in practice the client signals always come after those of the transmitter signals, the DOWN can be fixed at low. Thus, the time average value of the differential output, (UP), is an indication of phase difference between the two signals.

When transmitter signal leads the client signal at a signal receiver as in FIG. 5, the PD toggles between the states {UP=0, DOWN=0} and {UP=1, DOWN=0}. And the UP/DOWN counter also outputs a value with time. In this case the PD outputs a positive value implying the transmitter leads the client signal at the signal receiver.

Figure 6:
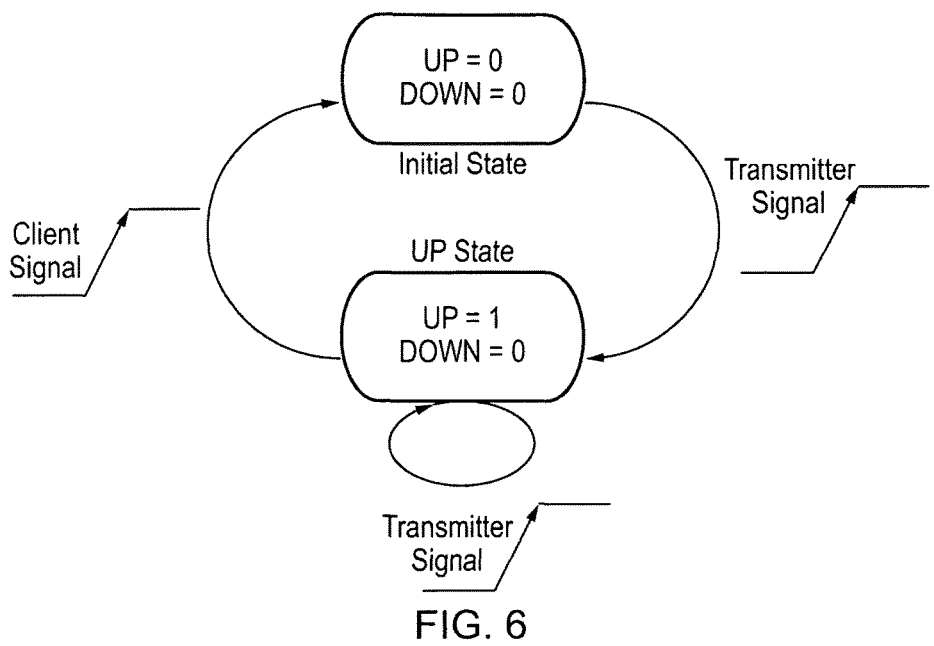
FIG. 6 illustrates the state diagram of the phase detector of FIG. 4.

FIG. 6 illustrates the state diagram of the PD. The PD can be in one of two states:
1. {UP=0, DOWN=0}
2. {UP=1, DOWN=0}

According to FIG. 6, the D-type flip-flops are triggered by the positive-going edges of inputs, transmitter signal and client signal, to the PD. Initially, both outputs are low. When one of the PD inputs rises, the corresponding output becomes high. The state of the finite-state machine (FSM) moves from an initial state to an UP state. The state is held until the second input, the arrival of the client signal, goes high, which in turn resets the circuit and returns the FSM to the initial state.

Interface to Location Management Station Software

The slope of the PD counter output is positive and the slope basically stays the same until the next reset. To interface with the location management station software, the PD is implemented as follows:

1. Before the PD counter is reset at signal receiver i, the PD latches out the counter value, $C_i$, (may be zero or positive only in our application).
2. Pass $C_i$ to the location management station for processing.
3. At the location management station, convert this value $C_i$ to a phase distance in meters delta(receiver$_i$) by using the following expression:

$$\text{delta(receiver}_i) = \frac{C_i \cdot c}{f_{os}}$$

where c is the speed of light in meters per second.
4. Go to Step 1.

Impact of Phase Detector Sampling Frequency on Location Precision

In this embodiment, the signal receiver clock is assumed to be good enough to obtain sufficient location resolution. Detailed analysis of the signal receiver clock quality and its impact on the location accuracy is considered in this section.

Sensitivity of Frequency on Location Accuracy and Resolution

In general, the frequency magnitude of the high-speed sampling oscillator determines the location resolution, i.e., the granularity of location measurement, and the frequency stability determines the location accuracy, i.e., the variation in location resolution. From the speed of light formula, $c=f_\infty \lambda$, $\lambda=c/f_\infty$ which gives the relationship of the location resolution given a frequency value. The location accuracy due to a frequency deviation of ±ppm is given by $$LA = \frac{c}{f_\infty} - \frac{c}{f_\infty(1 \pm \text{ppm})} = \lambda \left[1 - \frac{1}{(1 \pm \text{ppm})}\right] \text{(meter)}.$$

Figure 7:
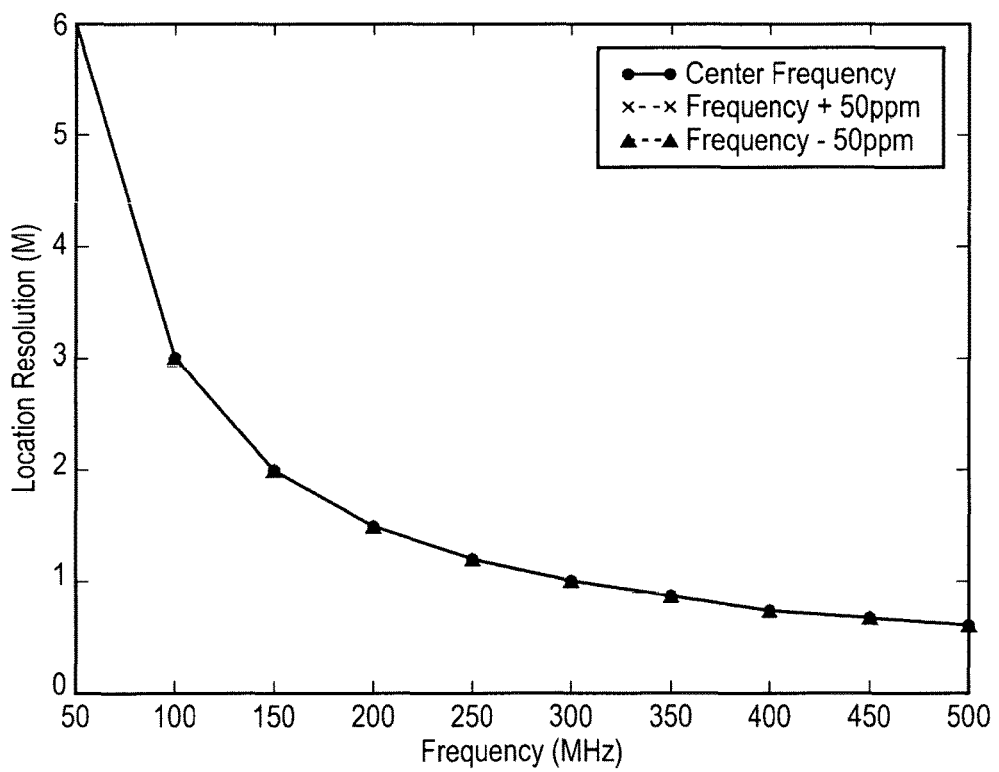
FIG. 7 shows a plot of location resolution versus frequency accuracy.
Figure 8:
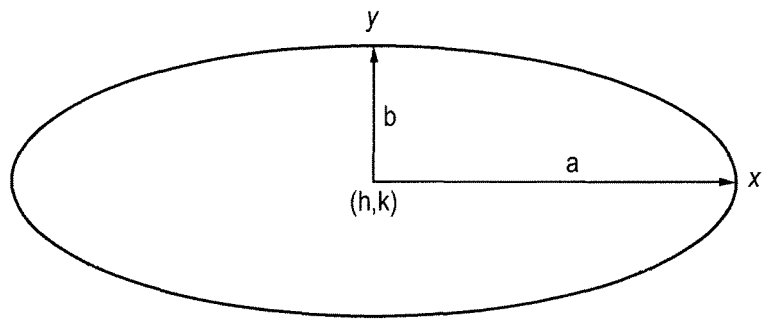
FIG. 8 illustrates the general parameters of ellipsoidal geometry and has already been described.
Figure 9:
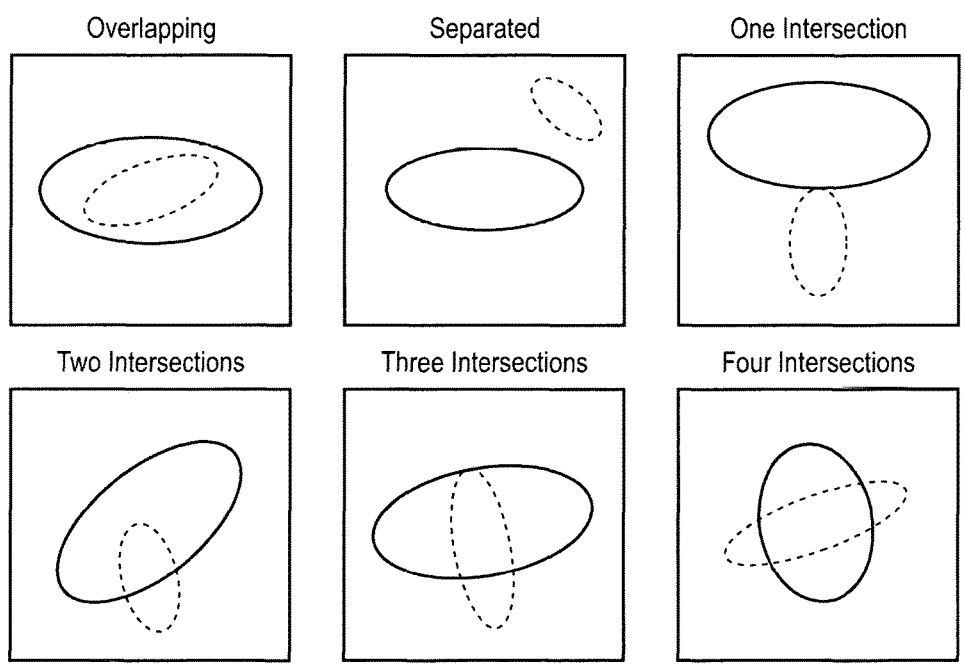
FIG. 9 shows the alternative possible intersections and overlaps of two arbitrarily located and oriented ellipses and has already been described.

Table 1 shows a sample range of location resolution for the frequency range of 50 MHz to 500 MHz with ±50 ppm. The corresponding graph (FIG. 7) shows that location resolution is more sensitive to the choice of frequency magnitude than location accuracy is to the choice of frequency stability.

TABLE 1

Location resolution and accuracy

| Frequency of High-Speed Oscillator $f_\infty$ (MHz) | Corresponding Location Resolution $\lambda = c/f_\infty$ (meter) 0 ppm unit in meter | Location Accuracy LA = λ [1 − 1/(1 ± ppm)] (meter) +50 ppm unit in μm | −50 ppm unit in μm |
|---|---|---|---|
| 50 | 5.9958 | 299.77747 | −299.80745 |
| 100 | 2.9979 | 149.88873 | −149.90372 |
| 150 | 1.9986 | 99.925823 | −99.935816 |
| 200 | 1.499 | 74.944367 | −74.951862 |
| 250 | 1.1992 | 59.955494 | −59.961489 |
| 300 | 0.99931 | 49.962912 | −49.967908 |
| 350 | 0.85655 | 42.825353 | −42.829635 |
| 400 | 0.74948 | 37.472184 | −37.475931 |
| 450 | 0.66621 | 33.308608 | −33.311939 |
| 500 | 0.59958 | 29.977747 | −29.980745 |

The location algorithm uses frequency in two distinct manners. The first use is in the signal generation at the transmitter. The signal from the transmitter serves as start time markers for all the receivers. The signal retransmitted by the client upon the receipt of the transmitter signal serves as the end time markers for all the receivers. The location resolution and accuracy of the algorithm, however, do not depend on the stability and the magnitude, i.e., nominal value, of the frequency used at the transmitter. The algorithm does require that these signals be distinguishable by the receivers and their periods not be ambiguous. The second use is in the measurement at each signal receiver of the separation of the two time markers described above. In this case, the choice of the frequency source used to make the measurement influences the granularity and the variation of the location resolution.

Application Specific Ellipses

Figure 10:
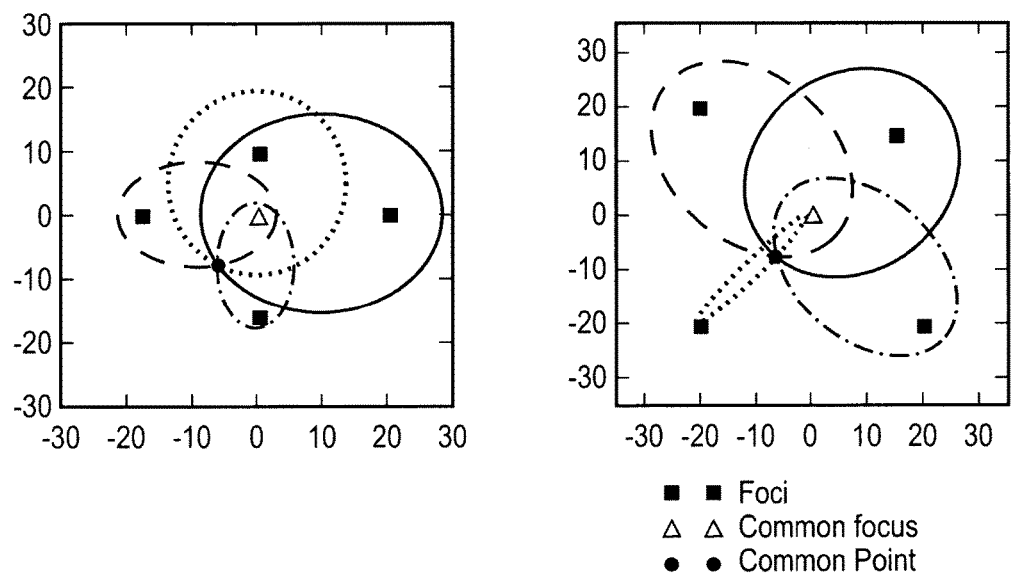
FIG. 10 illustrates ellipses each with a distinct focus but sharing a common focus and a common point.

Note that the ellipses in the formulation used in the present embodiments have the following additional characteristics, also shown in FIG. 10:
- the transmitter is the common focus of all the formulated ellipses
- the other focus is always a receiver
- the ellipses formulated always share at least one common point which is the location of the client on their respective ellipses The following two sections describe how the embodiments of the present invention make use of this application specific configuration to choose the transmitter and determine the general location of client.

Choosing the Transceiver

The transceiver chosen is preferably the one which is nearest to the client. One method to determine is to use ranging from the potential transmitter and the client. The transmitter with the smallest round trip delay is chosen.

Note that it is not necessary to choose the nearest transmitter provided that the transmitter period is greater than the time needed to reach the farthest receiver through the client from the transmitter.

Determining the General Location of Client

Figure 11:
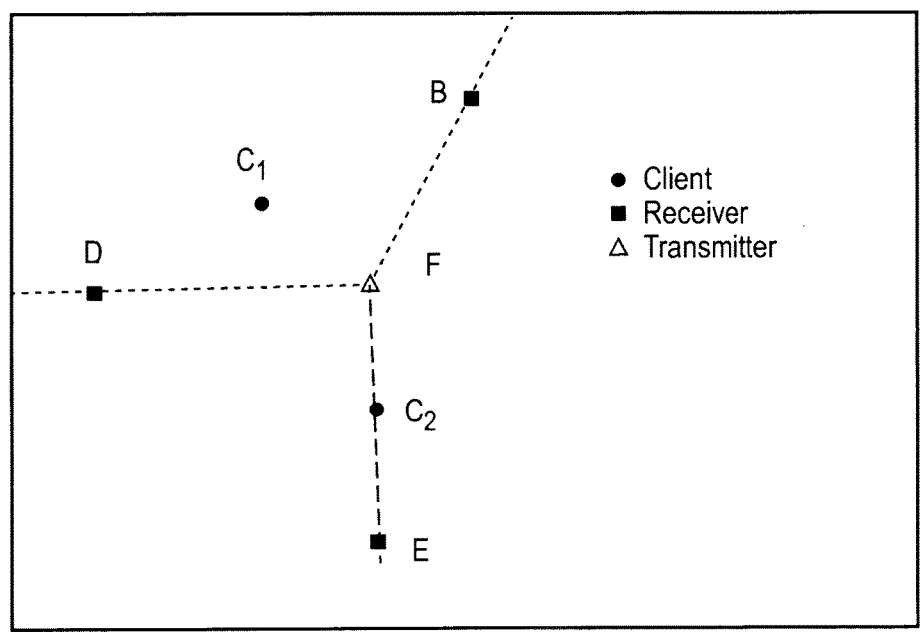
FIG. 11 illustrates the general location of a potential client with respect to a transmitter and receivers.
Figure 12:
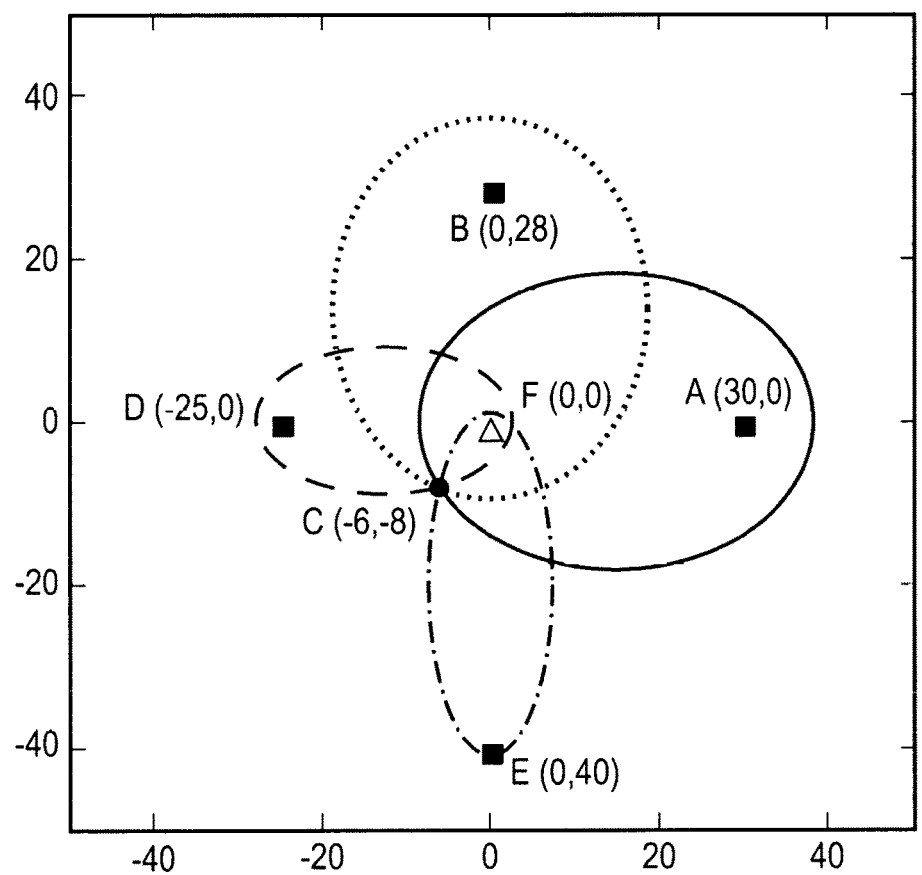
FIG. 12 shows an example scenario of ellipse-based location determination of a client according to an embodiment of the present invention.

Once the transmitter, which is the common focus of all the formulated ellipses, is chosen, the general location of the client with respect to the receivers, which are the other focus of the ellipses, can be determined. The client can be in one of the two general locations as shown in FIG. 11:
- on the line segment determined by the transmitter and one of the receivers
  - this is true if the distance between the foci (transmitter and the receiver) is equal to the sum of the distance between the transmitter and the client, and the distance between the client and the receiver
- within the sector formed by the line segments determined by the transmitter and two receivers
  - two adjacent half-lines starting at the transmitter and going through adjacent receivers form a sector
  - the sector containing the client has the client to the left of one of its half-line and to the right of the other half-line
  - the client is also the common intersection of all the formulated ellipses An example of ellipse-based determination of client location is illustrated in FIG. 12. The transmitter is at (0, 0) denoted by F and the receivers are A, B, D, and E, respectively at (30, 0), (0, 28), (−25, 0) and (0, 40). The ellipses formed by F as the common focus, A, B, D, and E as one of the other foci and some further information derived in the manner set out below determine that the client C is at (−6, −8).

Location System Algorithm—Algorithm at Location Management Station

Using the basic concepts described earlier and the background mathematical material provided above, a location system algorithm that is run at the management station, which forms an embodiment of the present invention, will be described.

As set out previously, given that the position of the transmitter is known relative to the signal receivers, the phase distance delta(receiver$_i$) at a receiver i can be determined and then used together with the corresponding transmitter and receiver locations information to construct the locus of the estimate of the client position.

Assumptions:
- The transmitter continuously emits two pulses of distinct signature at a regular time interval that is greater than the time required to reach the farthest receiver through the client from the transmitter.
- The client emits pulses of distinct signature, also different from but correlated to that of the transmitter, upon receipt of each of the transmitter signals.
- Without loss of generality, a simple layout of the transmitter and receivers is used to illustrate the location concept. It allows for the use of quadratic equation instead of numerical computation in finding the location of the client as in the general case. For this layout, a receiver is located at each tip of a cross with the transmitter which is at the intersection of the cross as shown in FIG. 12.

Parameters:
- delta(receiver$_i$): The distance difference (or phase distance) in meters corresponding to the phase in seconds of the transmitter and the client signals at receiver$_i$. The client signal is the signal relayed by the client after having received the transmitter signal.
- location(receiver$_i$): the location of receiver$_i$ such as ($x_i$, $y_i$)
- location(transmitter): the location of transmitter such as (x, y)

Measurement Procedure:
- transmitter sends a distinguishable signal to both the client and each receiver receiver$_i$.
- As soon as transmitter signal arrives at receiver$_i$, a timer starts counting until the signal relayed through the client arrives.
- The timer value at the arrival of the signal relayed through the client is the time value of delta(receiver$_i$).

Algorithm:
1. Client chooses a transmitter
2. For each receiver$_i$, 1≤i≤4
   determine delta(receiver$_i$)
   compute the associated ellipse $E_i$ based on location (transmitter), location(receiver$_i$), and delta(receiver$_i$) using the following information:
   $2a_i$=distance(location(transmitter),location(receiver$_i$))+delta(receiver$_i$)
   $e_i$=distance(location(transmitter),location(receiver$_i$))÷$2a_i$
   $b_i$=±$a_i\sqrt{1-e_i^2}$
   ($h_i$, $k_i$) computed based on the foci of ellipse$_i$, location(transmitter) and location(receiver$_i$)
3. For each pairs of ellipses, $E_i$ and $E_j$ with a common focus at the transmitter location, find their intersection. Although there are six distinct pairs of ellipses, only two distinct pairs are needed to uniquely determine the client location.

Two ellipses, $E_i$ with center at $(h_i, k_i)$ and width and height $(a_i, b_i)$ and $E_j$ with center at $(h_j, k_k)$ and width and height $(a_j, b_j)$ intersect at $(x_n, y_n)$ for n=0 when there is no intersection and n=4 when there is maximum number of intersections.

The points of intersections is obtained by solving numerically the following two simultaneous equations, one from each of the ellipses:

$$\frac{(x-h_i)^2}{a_i^2} + \frac{(y-k_i)^2}{b_i^2} = 1$$

$$\frac{(x-h_j)^2}{a_j^2} + \frac{(y-k_j)^2}{b_j^2} = 1$$

Figure 13:
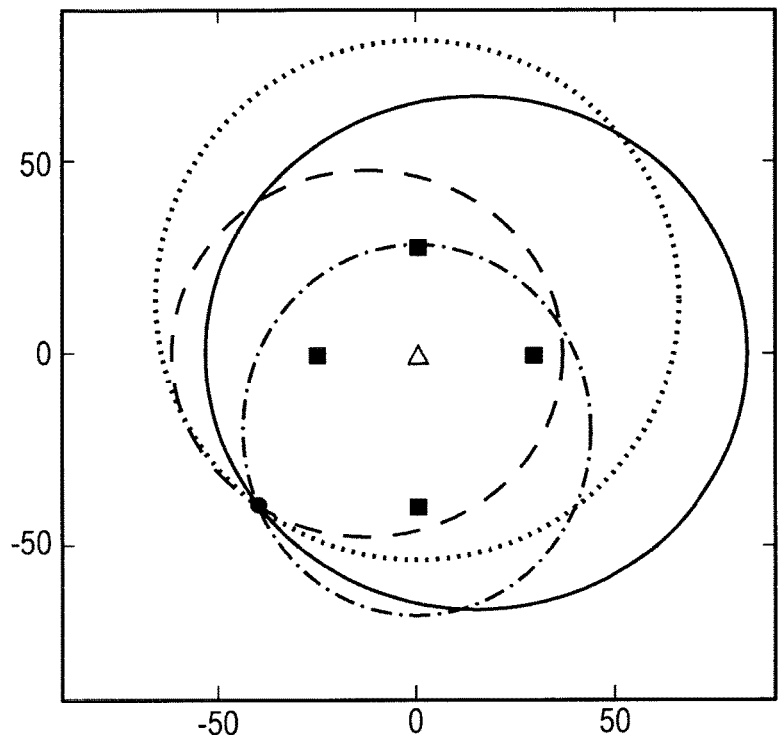
FIG. 13 shows a further example scenario of ellipse-based location determination of a client according to an embodiment of the present invention.
Figure 14:
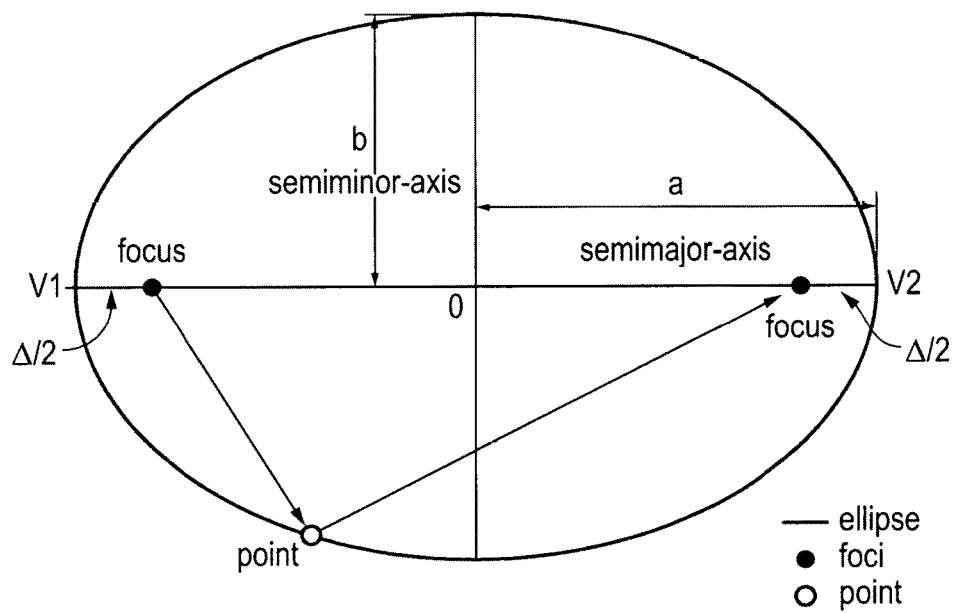
FIG. 14 illustrates how the standard parameters of an ellipse are derived and has already been described.

4. Even if the client location is outside of the convex polygon formed by the foci of all the ellipses, the client location is still given by the intersection point that is common to all pairs of ellipses as shown in FIG. 13.

Operation of the Location System—Examples

The following example illustrates, how under certain assumptions, it is possible to obtain a closed form solution for finding the client location. The first assumption is that all the ellipses of interest share a common focus which corresponds to the transmitter's location. (Using multiple transmitters is also possible but this scenario will not be described further herein.) The other foci can then be grouped into two pairs. The second assumption is that each pair of foci forms the end point a line segment containing the common focus. The third assumption is that, without loss of generality, these two line segments are perpendicular to each other.

It is always possible to translate the common focus to (0,0), compute the intersections if the last assumption is not true, and then translate the computed intersections back by the opposite amount needed to translate the common focus to (0,0).

Without the third assumption, the true intersections can always be found by rotating the computed intersections by the angle between the two pairs of line segments at the common focus.

Without the second assumption, the intersections would need to be computed numerically, according to known methods.

However, on the basis of the three assumptions, a closed form solution can be described.

Assuming the two ellipses, $E_1$ and $E_2$, are respectively centered at $(h_1', k_1')$ and $(h_2, k_2)$, and have their major axis horizontally aligned $(k_1'=k_2)$, then the following ellipse equations can be prepared:

$$\frac{(x-h_1')^2}{a_1^2} + \frac{(y-k_1')^2}{b_1^2} = 1$$

$$\frac{(x-h_2)^2}{a_2^2} + \frac{(y-k_2)^2}{b_2^2} = 1$$

where, $a_1 > b_1$, and $a_2 > b_2$.

These ellipses can be translated, if necessary, so that one of it is centered at (0,0) by adding $(h_2, k_2)$ to all their (x, y) values as follows:

$$\frac{(x-h_1'+h_2)^2}{a_1^2} + \frac{(y-k_1'+k_2)^2}{b_1^2} = 1 \Rightarrow \frac{(x-h_1)^2}{a_1^2} + \frac{y^2}{b_1^2} = 1$$

$$\frac{(x-h_2+h_2)^2}{a_2^2} + \frac{(y-k_2+k_2)^2}{b_2^2} = 1 \Rightarrow \frac{x^2}{a_2^2} + \frac{y^2}{b_2^2} = 1$$

where $h_1 = h_1' - h_2$.

Solving the intersections of these two ellipses reduces to solving for the two unknowns based on the above two equations. Using $y^2 = (a_2^2 b_2^2 - b_2^2 x^2)/a_2^2$ in $$\frac{(x-h_1)^2}{a_1^2} + \frac{y^2}{b_1^2} = 1,$$

gives the following:

$$\frac{(x-h_1)^2}{a_1^2} + \frac{a_2^2 b_2^2 - b_2^2 x^2}{a_2^2 b_1^2} = 1$$

$$(x-h_1)^2 + \frac{a_1^2 a_2^2 b_2^2 - a_1^2 b_2^2 x^2}{a_2^2 b_1^2} = a_1^2$$

$$(x-h_1)^2 + \frac{a_1^2 b_2^2 x^2}{a_2^2 b_1^2} = a_1^2 - \frac{a_1^2 a_2^2 b_2^2}{a_2^2 b_1^2}$$

$$x^2 - 2h_1 x + h_1^2 - \frac{a_1^2 b_2^2 x^2}{a_2^2 b_1^2} = a_1^2 - \frac{a_1^2 a_2^2 b_2^2}{a_2^2 b_1^2}$$

$$x^2 - \frac{a_1^2 b_2^2 x^2}{a_2^2 b_1^2} - 2h_1 x + h_1^2 - a_1^2 + \frac{a_1^2 a_2^2 b_2^2}{a_2^2 b_1^2} = 0$$

$$\left(1 - \frac{a_1^2 b_2^2}{a_2^2 b_1^2}\right) x^2 - 2h_1 x + h_1^2 - a_1^2 + \frac{a_1^2 a_2^2 b_2^2}{a_2^2 b_1^2} = 0$$

The above equation reduces to a quadratic equation of the form:

$$Ax^2 + 2Bx + C = 0, \text{ where}$$

$$A = \left(1 - \frac{a_1^2 b_2^2}{a_2^2 b_1^2}\right), B = -2h_1, C = h_1^2 - a_1^2 + \frac{a_1^2 b_2^2}{b_1^2}$$

The value of x is given by:

$$x_\pm = \frac{-B \pm \sqrt{B^2 - 4AC}}{2A}.$$

The value of y is obtained by solving $$\frac{x_\pm^2}{a_1^2} + \frac{y^2}{b_1^2} = 1$$

giving $$y_\pm = \pm \sqrt{(b_1^2(1 - x_\pm^2/a_1^2)}$$

The intersection points are then given as follows:
$(x_+, y_+)$,
$(x_+, y_-)$,
$(x_-, y_+)$, and
$(x_-, y_-)$.

Translating these intersection points to those of the untranslated ellipses, we have the followings:

$$p_{1 \text{ of } 1,2}=(x_+-h_2, y_+-k_2),$$

$$p_{2 \text{ of } 1,2}=(x_+-h_2, y_--k_2),$$

$$p_{3 \text{ of } 1,2}=(x_--h_2, y_+-k_2), \text{ and}$$

$$p_{4 \text{ of } 1,2}=(x_--h_2, y_--k_2).$$

Assuming the other two ellipses, $E_3$ and $E_4$, have their major axis vertically aligned and respectively centered at $(h_3', k_3')$ and $(h_4, k_4)$, we have the following ellipse equations:

$$\frac{(x-h_3')^2}{b_3^2} + \frac{(y-k_3')^2}{a_3^2} = 1$$

$$\frac{(x-h_4)^2}{b_4^2} + \frac{(y-k_4)^2}{a_4^2} = 1$$

where $h_3'=h_4$, $a_3>b_3$, and $a_4>b_4$.

These ellipses can be translated so that one of it is centered at (0,0) by adding $(h_4, k_4)$ to all their (x, y) values as follows:

$$\frac{(x-h_3'+h_4)^2}{b_3^2} + \frac{(y-k_3'+k_4)^2}{a_3^2} = 1 \Rightarrow \frac{(x-h_3)^2}{b_3^2} + \frac{y^2}{a_3^2} = 1$$

$$\frac{(x-h_4+h_4)^2}{b_4^2} + \frac{(y-k_4+k_4)^2}{a_4^2} = 1 \Rightarrow \frac{x^2}{b_4^2} + \frac{y^2}{a_4^2} = 1$$

where $h_3=h_3'-h_4$.

Solving the above equations as for the horizontally aligned ellipses and translating them back, we have the following intersections points:

$$p_{1 \text{ of } 3,4}=(x_+-h_4, y_+-k_4),$$

$$p_{2 \text{ of } 3,4}=(x_+-h_4, y_--k_4),$$

$$p_{3 \text{ of } 3,4}=(x_--h_4, y_+-k_4), \text{ and}$$

$$p_{4 \text{ of } 3,4}=(x_--h_4, y_--k_4).$$

The location of the client is the common point among the following points of $E_1$ and $E_2$, and $E_3$ and $E_4$:

$$p_{1 \text{ of } 1,2}=(x_+-h_2, y_+-k_2),$$

$$p_{2 \text{ of } 1,2}=(x_+-h_2, y_--k_2),$$

$$p_{3 \text{ of } 1,2}=(x_--h_2, y_+-k_2),$$

$$p_{4 \text{ of } 1,2}=(x_--h_2, y_--k_2),$$

$$p_{1 \text{ of } 3,4}=(x_+-h_4, y_+-k_4),$$

$$p_{2 \text{ of } 3,4}=(x_+-h_4, y_--k_4),$$

$$p_{3 \text{ of } 3,4}=(x_--h_4, y_+-k_4), \text{ and}$$

$$p_{4 \text{ of } 3,4}=(x_--h_4, y_--k_4).$$

Observations

From the above location examples, it can be seen that each receiver consistently determines its time difference of arrival of the transmitter signal relayed by client signal and that of the transmitter signal. This information, together with the locations of the transmitter and receiver as foci, can be used to formulate an ellipse. The client's location is accordingly the common intersection of the formulated ellipses. Clearly, given measurement errors and numerical errors, precise intersection may not arise in every instance, but a common point can be determined or estimated which may, for example, be based in part on the smallest cluster of closest intersection points. For example, the centroid of the convex polygon formed by the said smallest cluster of closest intersection points can be considered as the location estimate.

Moreover, it is noted from the clock accuracy analysis that the location system still has accurate location resolution even if the signal receivers are run asynchronously, as long as their parts-per-million (ppm) frequency accuracies are within the order of a few tens of ppm around a common nominal value.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display. The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1]. ITU-T G.8261, *Timing and Synchronization aspects in Packet Networks*.

[2]. Intersection of Ellipses, David Eberly, Geometric Tools, Redmond Wash. 98052, Created: Oct. 10, 2000, Last Modified: Jun. 23, 2015

All references referred to above are hereby incorporated by reference.

The estimated location of the client device can be used in any number of systems and methods, including all of the systems and methods mentioned in the Background. In exemplary embodiments, the estimated location of the client device is transmitted by a first remote computer (remote with respect to the client device) doing the estimation of the location to a second remote computer having (a) delivery vehicle location tracking code executing thereon, (b) package or shipment location tracking code executing thereon, (c) service personnel location management code executing thereon, (d) workforce management code executing thereon, (e) asset management code executing thereon, (f) roadside assistance code executing thereon, (g) city/area boundary maintenance code executing thereon, (h) driving directions code executing thereon, (i) enhanced dispatch code executing thereon, (j) public safety services code executing thereon, (k) security applications (including tracking the locations of probationers) code executing thereon, (l) child location tracking code executing thereon, (m) service locator code executing thereon, and/or (n) wireless sensor network location code executing thereon for use in those methods. In other exemplary embodiments, the estimated location of the client device is used locally by a remote computer (remote with respect to the client device) doing the estimation (a) to delivery vehicle location tracking code executing thereon, (b) to package or shipment location tracking code executing thereon, (c) to service personnel location management code executing thereon, (d) to workforce management code executing thereon, (e) to asset management code executing thereon, (f) to roadside assistance code executing thereon, (g) to city/area boundary maintenance code executing thereon, (h) to driving directions code executing thereon, (i) to enhanced dispatch code executing thereon, (j) to public safety services code executing thereon, (k) to security applications (including tracking the locations of probationers) code executing thereon, (l) to child location tracking code executing thereon, (m) to service locator code executing thereon, and/or (n) to wireless sensor network location code executing thereon for use in those methods.

The invention claimed is:

1. A system configured to track a client device, the system including:
   a transmitter station configured to transmit a first wireless signal;
   at least three receiver stations; and
   a location management station, wherein:
   each receiver station is configured to receive the first signal and a second wireless signal transmitted from the client device and triggered by receipt of the first signal by the client device;
   the receiver stations and/or the location management station are configured to determine a time difference of arrival between the first signal and second signal for each of the receiver stations;
   the location management station is configured to, at multiple times:
   compute, based on the corresponding time difference of arrival for each receiver station, a plurality of ellipses each associated with a respective receiver station, each ellipse having a first focal point corresponding to the transmitter station and having a second focal point corresponding to the respective receiver station;
   determine a plurality of intersection points between pairs of said ellipses;
   estimate the location of the client device using said determined intersection points; and
   the location management station is configured to use the locations estimated at the multiple times to track movement of the client device.

2. The system of claim 1, wherein a semi-major axis or a semi-minor axis of each ellipse is calculated based on the corresponding time difference of arrival for that receiver station.

3. The system of claim 1 wherein the receiver stations and/or the location management station are configured to determine a distance, delta(receiver$_i$), which is the distance corresponding to the time difference between the receipt of the first signal and receipt of the second signal at the i$^{th}$ receiver station.

4. The system of claim 3, wherein the location management station is configured to calculate, for an i$^{th}$ ellipse corresponding to an i$^{th}$ receiver station, a semi-major axis $a_i$ which is half of the sum of: a) a known distance, distance($f_1$, $f_2$), between the respective receiver station and the transmitter station; and b) delta (receiver$_i$).

5. The system of claim 4, wherein the location management station is configured to calculate, for an i$^{th}$ ellipse corresponding to an i$^{th}$ receiver station, an eccentricity $e_i$ of the ellipse as:

$$e_i = \frac{\text{distance}(f_1, f_2)}{2a_i}.$$

6. The system of claim 5, wherein the location management station is configured to calculate, for an i$^{th}$ ellipse corresponding to an i$^{th}$ receiver station, a semi-minor axis $b_i$ of the ellipse as:

$$b_i = +a_i\sqrt{1-e_i^2}.$$

7. The system of claim 6, wherein, when determining a plurality of intersection points between pairs of said ellipses, the location management station is configured to solve, for at least two distinct pairs of the computed ellipses, the following simultaneous equations:

$$\frac{(x-h_i)^2}{a_i^2} + \frac{(y-k_i)^2}{b_i^2} = 1;$$

and $$\frac{(x-h_j)^2}{a_j^2} + \frac{(y-k_j)^2}{b_j^2} = 1$$

where ($h_i$, $k_i$) is the center of the ellipse corresponding to an i$^{th}$ receiver station and is computed based on the foci of the said ellipse receiver station and the transmitter locations; ($h_j$, $k_j$) is the center of the ellipse corresponding to an j$^{th}$ receiver station and is computed based on the foci of the said ellipse receiver station and the transmitter locations; and each (x, y) satisfying the above simultaneous equations corresponds to the coordinates of an intersection point between the pair of ellipses.

8. The system of claim 7, wherein the location management station determines an intersection point in common between the at least two distinct pairs of computed ellipses.

9. The system of claim 1, wherein the receiver stations share a common clock.

10. The system of claim 1, wherein each receiver station includes an independently running clock and wherein the clocks of each receiver station share a nominal frequency.

11. The system of claim 1, wherein the transmitter station and the receiver stations are all transceiver stations, and wherein the transmitter station is chosen from the transceiver stations by determining a smallest round trip delay from each transceiver station to the client.

12. The system of claim 3, wherein the first signal and the second signal are periodic signals which share the same nominal frequency.

13. The system of claim 12, wherein each receiver station includes a signal phase detector circuit, the circuit counting at a frequency $f_{os}$ a number of counts $C_i$ between receiving the first signal and receiving the second signal at the respective receiver station, and the distance delta(receiver$_i$) is calculated as:

$$\text{delta(receiver}_i) = \frac{C_i \cdot c}{f_{os}},$$

where c is the speed of light.

14. The system of claim 1 further including the client device, wherein the client device is configured to transmit the second signal, the transmission of the second signal being triggered by receipt of the first signal at the client.

15. A method of tracking a client device using a wireless network, the method having the steps of:
- transmitting, from a transmitter station, a first signal;
- receiving, at a client device, the first signal;
- transmitting, from the client device, a second signal which corresponds to the first signal and whose transmission is triggered by receipt of the first signal;
- receiving, at each of at least three receiver stations, the first signal and the second signal;
- determining, for each of the receiver stations, a time difference of arrival between the first signal and second signal;
- computing, for each of the receiver stations and based on the corresponding time difference of arrival, an ellipse having a first focal point corresponding to the transmitter station and having a second focal point corresponding to the respective receiver station;
- determining a plurality of intersection points between pairs of said ellipses;
- estimating the location of the client device using said determined intersection points;
- repeating the above steps to obtain a plurality of estimated locations of the client device; and
- using the plurality of estimated locations to track the client device.

16. The method of claim 15, wherein a semi-major axis or a semi-minor axis of each ellipse is calculated based on the corresponding time difference of arrival for that receiver station.

17. The method of claim 15, including a step of determining a distance, delta(receiver$_i$), which is the distance corresponding to the time difference between the receipt of the first signal and receipt of the second signal at the $i^{th}$ receiver station.

18. The method of claim 17, including a step of calculating, for an $i^{th}$ ellipse corresponding to an $i^{th}$ receiver station, a semi-major axis $a_i$ which is half of the sum of: a) a known distance, distance($f_1$, $f_2$) between the respective receiver station and the transmitter station; and b) delta (receiver$_i$).

19. The method of claim 18, including a step of calculating, for an $i^{th}$ ellipse corresponding to an $i^{th}$ receiver station, an eccentricity $e_i$ of the ellipse as:

$$e_i = \frac{\text{distance}(f_1, f_2)}{2a_i}.$$

20. The method of claim 19, including a step of calculating, for an $i^{th}$ ellipse corresponding to an $i^{th}$ receiver station, a semi-minor axis $b_i$, of the ellipse as:

$$b_i = +a_i\sqrt{1-e_i^2}.$$

21. The method of claim 20, including a step of solving, for at least two distinct pairs of the computed ellipses, the following simultaneous equations:

$$\frac{(x-h_i)^2}{a_i^2} + \frac{(y-k_i)^2}{b_i^2} = 1;$$

and $$\frac{(x-h_j)^2}{a_j^2} + \frac{(y-k_j)^2}{b_j^2} = 1$$

where ($h_i$, $k_i$) is the center of the ellipse corresponding to an $i^{th}$ receiver station and is computed based on the foci of the said ellipse receiver station and the transmitter locations; ($h_j$, $k_j$) is the center of the ellipse corresponding to an $j^{th}$ receiver station and is computed based on the foci of the said ellipse receiver station and the transmitter locations; and each (x, y) satisfying the above simultaneous equations corresponds to the coordinates of an intersection point between the pair of ellipses.

22. The method of claim 15, wherein the receiver stations share a common clock.

23. The method of claim 15, wherein each receiver station includes an independently running clock and wherein the clocks of each receiver station share a nominal frequency.

24. The method of claim 15, wherein the transmitter station and the receiver stations are all transceiver stations, and the method includes a step of:
- choosing the transmitter station from the transceiver stations by determining a smallest round trip delay from each transceiver station to the client.

25. The method of claim 17, wherein the first signal and the second signal are periodic signals which share the same nominal frequency.

26. The method of claim 25, wherein a signal phase detector circuit, within each receiver station, counts at a frequency $f_{os}$ a number of counts $C_i$ between receiving the first signal and receiving the second signal at the respective receiver station, and calculates the distance delta(receiver$_i$) as:

$$\text{delta(receiver}_i) = \frac{C_i \cdot c}{f_{os}},$$

wherein c is the speed of light.

27. A location tracking management station, connected to a wireless network, and having a processor, wherein the processor is configured to:
- receive, from each of at least three receiver stations connected to the wireless network, a time difference of arrival measurement, the time difference of arrival measurement being the time difference between the arrival of a first signal and a second signal at the respective received stations, wherein:
  - the first signal is a signal transmitted from a transmitter station; and
  - the second signal is a signal corresponding to the first signal and transmitted from a client device, the transmission of which is triggered by receipt, at the client device, of the first signal;
- compute, for each of the receiver stations and based on the corresponding time difference of arrival, an ellipse having a first focal point corresponding to the transmitter station and having a second focal point corresponding to the respective receiver station;
- determine a plurality of intersection points between pairs of said ellipses; and
- estimate the location of the client device using said determined intersection points;
- repeat the above steps to obtain a plurality of estimated locations of the client device; and
- use the plurality of estimated locations to track the client device.

* * * * *